US006965443B2

(12) United States Patent
Kato

(10) Patent No.: US 6,965,443 B2
(45) Date of Patent: *Nov. 15, 2005

(54) COMMUNICATION APPARATUS AND STORAGE MEDIUM

(75) Inventor: Tokunori Kato, Ichinomiya (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 92 days.

(21) Appl. No.: 09/174,090

(22) Filed: Oct. 16, 1998

(65) Prior Publication Data

US 2002/0048040 A1 Apr. 25, 2002

(30) Foreign Application Priority Data

Nov. 28, 1997 (JP) .............................................. 9-343910

(51) Int. Cl.⁷ ................................................. H04N 1/00
(52) U.S. Cl. ................... 358/1.15; 358/407; 379/93.24; 379/100.09
(58) Field of Search .............................. 358/1.15, 402, 358/403, 407, 434, 435, 442, 443, 468; 709/232, 239; 379/93.24, 100.08, 100.09, 100.13, 100.15

(56) References Cited

U.S. PATENT DOCUMENTS 5,767,985 A * 6/1998 Yamamoto et al. ......... 358/402
5,805,298 A * 9/1998 Ho et al. .................... 358/402
5,838,685 A * 11/1998 Hochman ................... 370/428
5,859,956 A * 1/1999 Sugiyama et al. ......... 358/1.13

(Continued)

FOREIGN PATENT DOCUMENTS

| JP | 5-30265 | 5/1993 | |
| JP | 08-102837 | 4/1996 | |
| JP | 8-242326 | 9/1996 | |
| JP | 9-149189 | 6/1997 | |
| JP | 10-133967 | 5/1998 | |
| WO | WO 97/10668 * | 3/1997 | ............ H04N/1/00 |
| WO | WO-97/10668 A1 * | 3/1997 | ............ H04N/1/00 |

OTHER PUBLICATIONS

Toshihisa Sawada, "'FeePort i66' Which Can Use an Intranet/Internet E–Mail", *Computer & Network LAN*, vol.15, Jul. 1, 1997, pp. 97–100.

"Facsimile Communications Which Can be Cheaply Sent via the Internet", *Nikkei Communications*, No. 222, May 20, 1996, pp. 59–61.

Hisashi Ibaraki et al., "NTTFAX i–400: LAN Directly Connected–Type Facsimile Using the Internet", *NTT Technology Journal*, vol. 9, No. 11, Nov. 1, 1997, pp. 84–85.

*Primary Examiner*—Edward Coles
*Assistant Examiner*—Joseph R. Pokrzywa
(74) *Attorney, Agent, or Firm*—Oliff & Berridge, PLC

(57) ABSTRACT

A communication apparatus that reduces the number of procedural steps that need to be performed by a user in attaching facsimile data to an e-mail and transmitting the e-mail, includes a CPU of a personal computer that starts a transmission program for performing a series of operations, such as causing a facsimile apparatus to scan a document, generating an image file of the scan data, attaching the image file to an email, and transmitting the e-mail. In accordance with the transmission program, a mail address, a scan mode, and a format for generating an image file of the scan data are set. Then, the CPU instructs the facsimile apparatus to start scanning a document. The CPU receives and stores scan data. Upon receiving a scan end command, the CPU converts the scan data into the format designated as described above, and generates an image file of the scan data. After attaching the image file to an e-mail, the CPU transmits the e-mail.

12 Claims, 6 Drawing Sheets

U.S. PATENT DOCUMENTS

| | | | |
|---|---|---|---|
| 5,862,202 A | * 1/1999 | Bashoura et al. | 379/100.14 |
| 5,872,845 A | * 2/1999 | Feder | 358/442 |
| 5,881,233 A | 3/1999 | Toyoda et al. | |
| 6,020,980 A | * 2/2000 | Freeman | 358/402 |
| 6,023,345 A | * 2/2000 | Bloomfield | 358/402 |
| 6,088,125 A | * 7/2000 | Okada et al. | 358/405 |
| 6,144,463 A | * 11/2000 | Utsumi et al. | 358/442 |
| 6,208,426 B1 | * 3/2001 | Saito et al. | 358/1.15 |
| 6,226,096 B1 | * 5/2001 | Ouchi | 358/1.14 |
| 6,384,927 B1 | * 5/2002 | Mori | 358/1.15 |

\* cited by examiner

COMMUNICATION APPARATUS AND STORAGE MEDIUM

BACKGROUND OF THE INVENTION

1. Field of Invention

The invention relates to a communication apparatus that transmits image information read by a facsimile apparatus or a scanner, via the Internet.

2. Description of Related Art

A known communication apparatus as described above takes in or receives facsimile data read by a facsimile apparatus, and attaches the received facsimile data to an e-mail and transmits the e-mail together with the facsimile data.

For transmission using this communication apparatus, a user normally needs to: (1) start an application for setting the utility of an image scanner provided in the facsimile apparatus; (2) input the scan mode, such as reading resolution and reading area, to a computer; (3) give a scan start instruction to the computer; (4) input and store scan data from the facsimile apparatus into the computer; (5) designate a format for filing the stored scan data; (6) retrieve stored scan data and convert it into the designated file to generate an image file; (7) start an application program for transmitting an e-mail; (8) input the mail address of a receiver to the computer; (9) prepare a cover sheet; (10) retrieve the image file and attach it to the e-mail; and (11) transmit the e-mail.

The conventional communication apparatus requires the many steps (1) through (11) in order to attach facsimile data to an e-mail and transmit the e-mail. Therefore, the conventional communication apparatus operates at a reduced working efficiency for facsimile data transmission.

SUMMARY OF THE INVENTION

Accordingly, the invention provides a communication apparatus that improves the working efficiency of facsimile data transmission by reducing the number of procedural steps that need to be performed by a user to transmit image information read from a document by a facsimile apparatus, via a communication device.

According to one aspect of the invention, there is provided a communication apparatus including a facsimile apparatus (or image reader) having a reading device that reads image information from a document, and a computer capable of transmitting various information to, and receiving various information from, the facsimile apparatus. The computer includes an instruction device that instructs the facsimile apparatus to operate the reading device so that image information is read from the document and to transmit the image information read by the reading device to the computer, a reception device that receives the image information transmitted from the facsimile apparatus in accordance with the instruction provided by the instruction device, a determination device that determines whether reception of the image information by the reception device has been completed, and a transmission device that transmits the image information received by the reception device to a receiver-side apparatus via a communication device if the determination device determines that the reception of the image information by the reception device has been completed.

In this communication apparatus, the instruction device provided in the computer instructs the facsimile apparatus to operate the reading device so that the reading device reads image information from a document and transmits the image information read by the reading device to the computer. The image information transmitted from the facsimile apparatus is received by the reception device of the computer. The determination device of the computer determines whether the reception of the image information by the reception device has been completed. If it is determined that the reception has been completed, the transmission device transmits the received image information to a receiver-side apparatus via a communication device.

In short, the image information read from a document by the reading device of the facsimile is received by the reception device of the computer. When the completion of the reception is detected, the received image data is automatically transmitted to a previously designated receiver-side apparatus.

Due to the automatic operation, the communication apparatus eliminates the need for a user to wait for the computer to receive and store the image information read by the facsimile apparatus, and to perform operations for retrieving the image information from storage, and transmitting the image information to a receiver-side apparatus. Thus, the communication apparatus of the invention improves the working efficiency in transmission of image information via a communication device.

In the communication apparatus of the invention, the computer may further include an e-mail transmission function of transmitting an e-mail via Internet, and a conversion device that converts the image information received by the reception device, into a format such that the image information becomes attachable to the e-mail. The transmission device attaches the image information converted by the conversion device, to the e-mail, and transmits the e-mail to the receiver-side apparatus via the Internet.

This structure eliminates the need for a user to perform an operation for converting the image information into a format such that the image information can be attached to an e-mail, in order to attach the image information received by the reception device, to the e-mail.

In the communication apparatus of the invention, the computer may further include a designation device that, before the instruction device outputs the instruction to the facsimile apparatus, designates a format for converting the image information so that the image information becomes attachable to the e-mail. The conversion device converts the image information on the basis of the format designated by the designated device.

Therefore, the format can be automatically designated by the designation device before the instruction device outputs the instruction to the facsimile apparatus.

According to another aspect of the invention, there is provided a storage for medium storing a program for controlling a communication apparatus including a facsimile apparatus having a reading device that reads image information from a document, and a computer capable of transmitting various information to, and receiving various information from, the facsimile apparatus. Other computer programs stored in the storage medium include a transmission instruction program for instructing the facsimile apparatus to operate the reading device so that the reading device reads image information from the document and transmits the image information read by the reading device to the computer, a reception program for receiving the image information transmitted from the facsimile apparatus in accordance with the instruction provided by the transmission instruction program, a determination program for determining whether reception of the image information by the reception program has been completed, and a transmission program for transmitting the image information received by the reception program to a receiver-side apparatus via a communication device if the determination program determines that reception of the image information by the reception program has been completed.

If the computer programs stored in the storage medium are installed into the computer, the computer becomes able to perform the instructing, receiving, determining and transmitting operations as described above.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

A preferred embodiment of the communication apparatus of the invention will be described in detail hereinafter with reference to the accompanying drawings.

Figure 1:
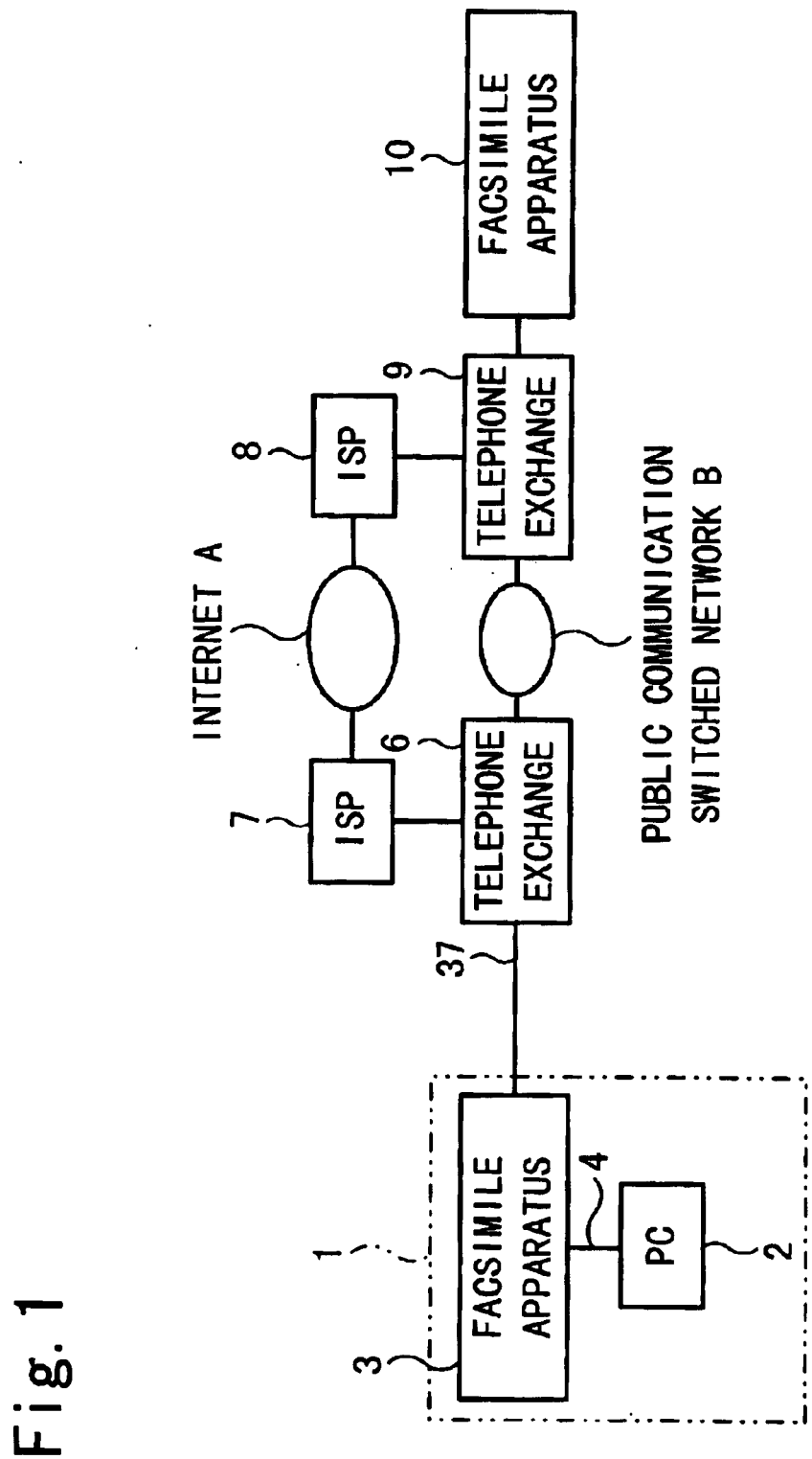
FIG. 1 is a block diagram illustrating the communication lines to which a facsimile apparatus according to a preferred embodiment of the invention is connected.

The structure of communication lines to which a communication apparatus is connected will be described with reference to the block diagram of FIG. 1. A communication apparatus 1 includes a personal computer (hereinafter, referred to "PC") 2 and a facsimile apparatus 3 connected to the PC 2 by a connecting cable 4. The PC 2 is connected to a telephone exchange 6 by a telephone line 5. The telephone exchange 6 is connected to the Internet A via an Internet service provider (ISP) 7. The Internet A is also connected to an ISP 8 that is connected to a facsimile apparatus 10 via a telephone exchange 9. The telephone exchange 6 and the telephone exchange 9 are also interconnected by a public communication switched network B. The facsimile apparatus 10 has a function of transmitting and receiving data via the Internet A or the public communication switched network B.

Figure 2:
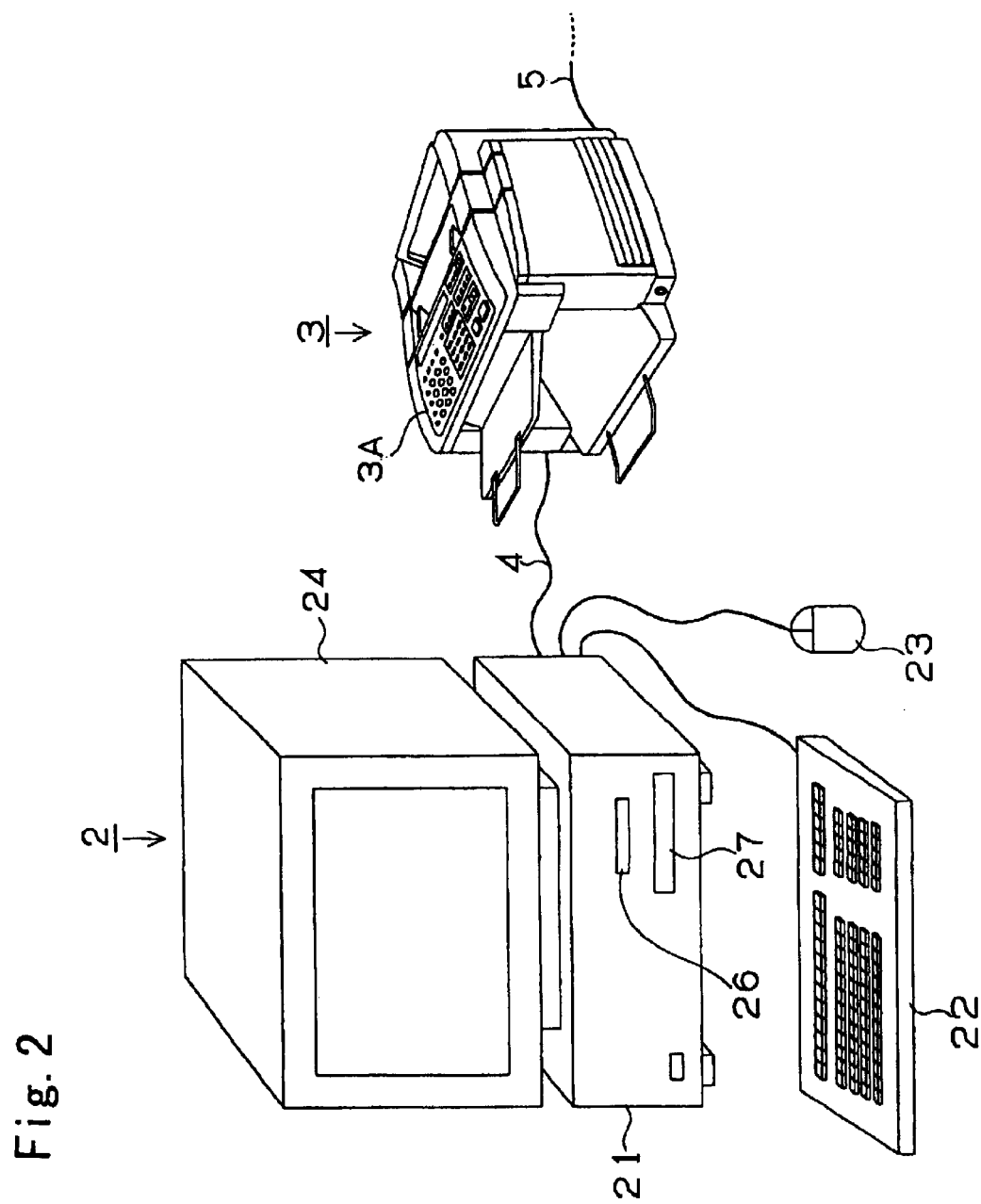
FIG. 2 shows a PC and a facsimile apparatus according to an embodiment of the invention.

The structures of the PC 2 and the facsimile apparatus 3 will be described with reference to FIG. 2, which shows their external appearances. While the figures illustrate a facsimile apparatus 3, these drawing are exemplary in that the invention is not limited to the operation of facsimiles. Accordingly, the invention may be applied to any image reading device.

The PC 2 includes a computer body 21 containing a CPU, a keyboard 22, a mouse 23, and a CRT monitor 24. The computer body 21 is connected to the facsimile apparatus 3 by the connecting cable 4. The computer body 21 is equipped with a floppy disk drive 26 for driving a 3.5-inch floppy disk (hereinafter, referred to as "FD"), and a CD-ROM drive 27 for driving a CD-ROM.

The facsimile apparatus 3 has an operating panel 3a that is equipped with numerical keys for inputting facsimile numbers and the like, a liquid crystal display (LCD), and the like.

Figure 3:
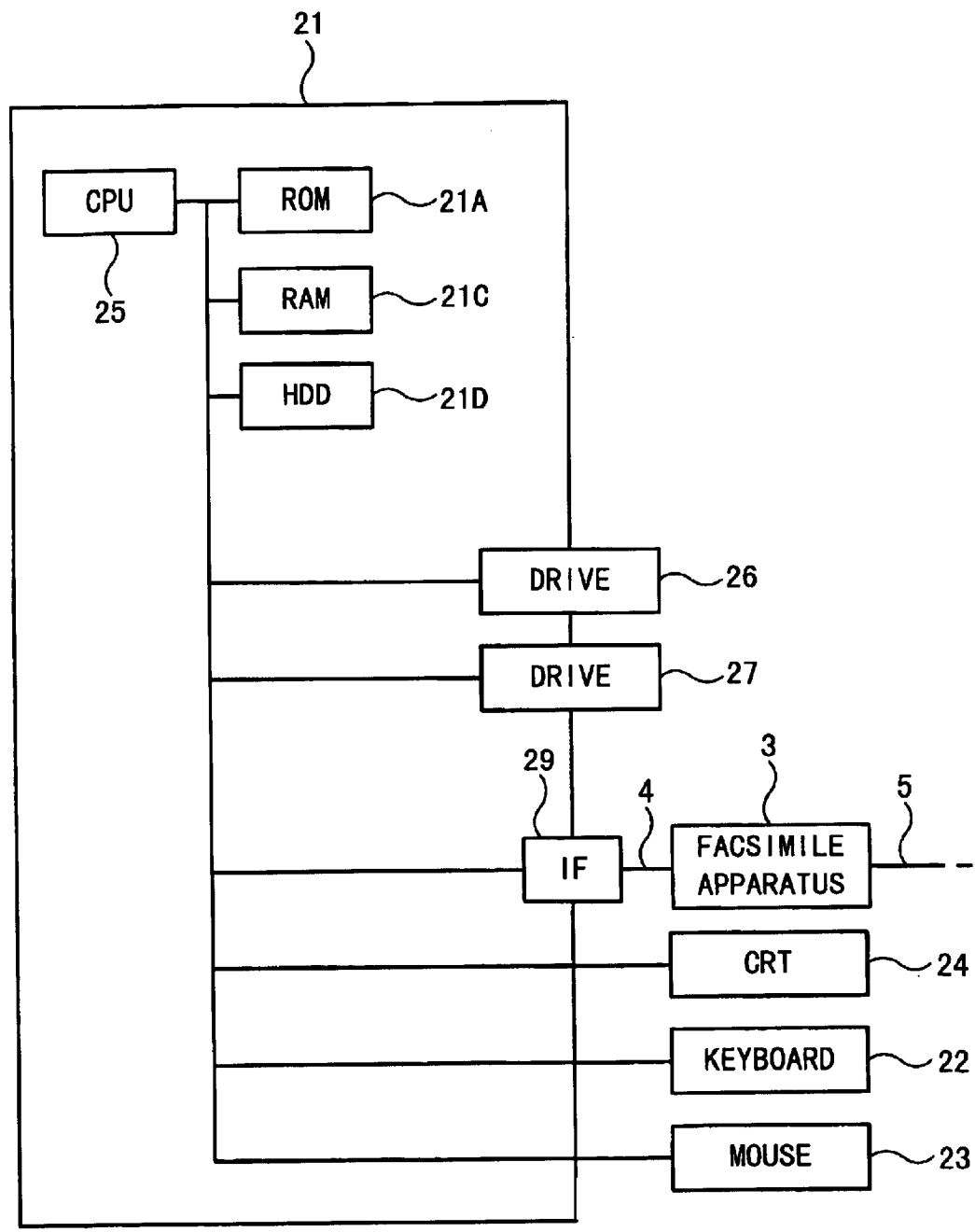
FIG. 3 is a block diagram of the PC shown in FIG. 2.

The electrical arrangement of the PC 2 will be described with reference to the block diagram of FIG. 3.

The computer body 21 contains a CPU 25 that executes operating system and application programs for managing the operation of the facsimile apparatus 3. The CPU 25 is connected to a hard disk drive (hereinafter, referred to as "HDD") 21d for storing various programs read by the FD drive 26 or the CD-ROM drive 27, an interface 29 for receiving scan data from the facsimile apparatus 3, via the connecting cable 4, a ROM 21a, and a RAM 21c for temporarily storing programs read from the HDD 21d.

Figure 4:
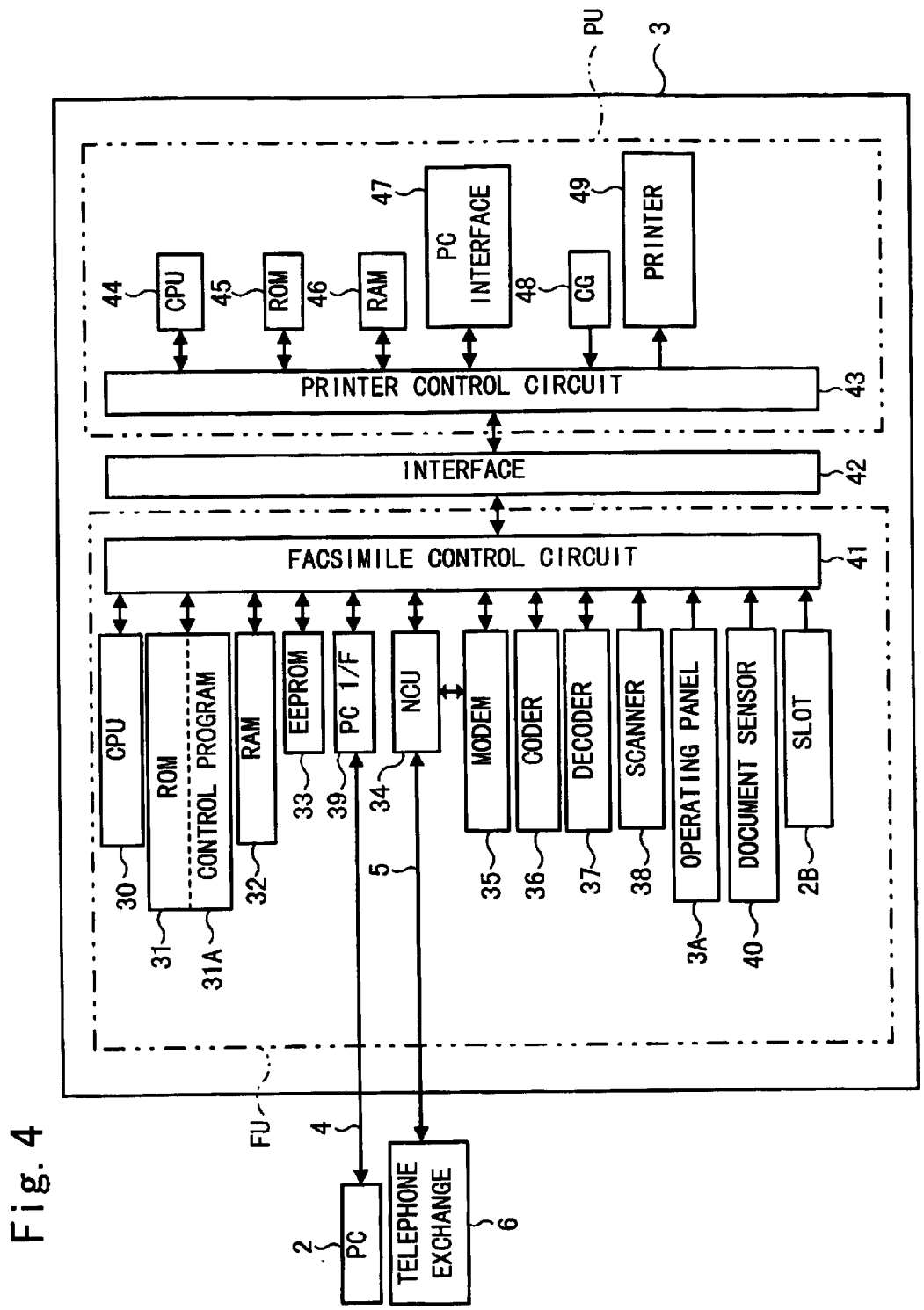
FIG. 4 is a block diagram of the electrical arrangement of the facsimile apparatus shown in FIG. 2.

The electrical arrangement of the facsimile apparatus 3 will be described with reference to the block diagram of FIG. 4. In this embodiment, the facsimile apparatus 3 is a multifunction facsimile apparatus equipped with a plurality of functions, such as a facsimile function, an image scanner function, a printer function, a copier function and the like. The facsimile apparatus 3 is equipped with a facsimile unit FU and a printer unit PU. The two units are interconnected by an interface 42.

The facsimile unit FU has a CPU 30 that executes control of the operation of an image scanner 38 and the like, and control of transmission of scan data on the basis of various instruction signals from the PC 2, and the like. The CPU 30 is connected to a facsimile control circuit 41. Furthermore, a ROM 31, a RAM 32 and an EEPROM 33 are also connected to the facsimile control circuit 41. The ROM 31 stores control programs 31a for the CPU 30 to execute the various controls. The RAM 32 temporarily stores image data read from a document by the image scanner 38, and the like.

The facsimile control circuit 41 is also connected to an NCU 34 that sends dial signals out to the telephone line 5 and answers a call signal from the telephone line 5. The NCU 34 is connected to a modem 35 for transmission and reception of data. Also connected to the facsimile control circuit 41 are a coder 36 that encodes the scan data read by the image scanner 38, or the like, for data compression when the facsimile apparatus 3 functions as a stand-alone facsimile apparatus, a decoder 37 that decodes coded data, such as received scan data and the like, and a document sensor 40 that detects a document set at a predetermined position.

The printer unit PU has a printer control circuit 43 that controls the printer 49. The printer control circuit 43 is connected to a CPU 44 that executes programs for controlling the printer 49. The printer control circuit 43 is also connected to a ROM 45 storing programs that are executed by the CPU 44, and the like, a RAM 45 including a work memory that is used during operation of the CPU 44, a print memory for storing print data, and the like, a PC interface 47 for connection to the PC 2, a character generator (CG) 48 storing vector fonts of characters, and the like, for printing, and the printer 49.

In this embodiment, the PC interface 39 is a parallel interface according to the Centronics standards. The facsimile apparatus 3 transmits data to and receives data from the PC 2 through the connecting cable 4 connected to the PC interface 39.

Figure 5:
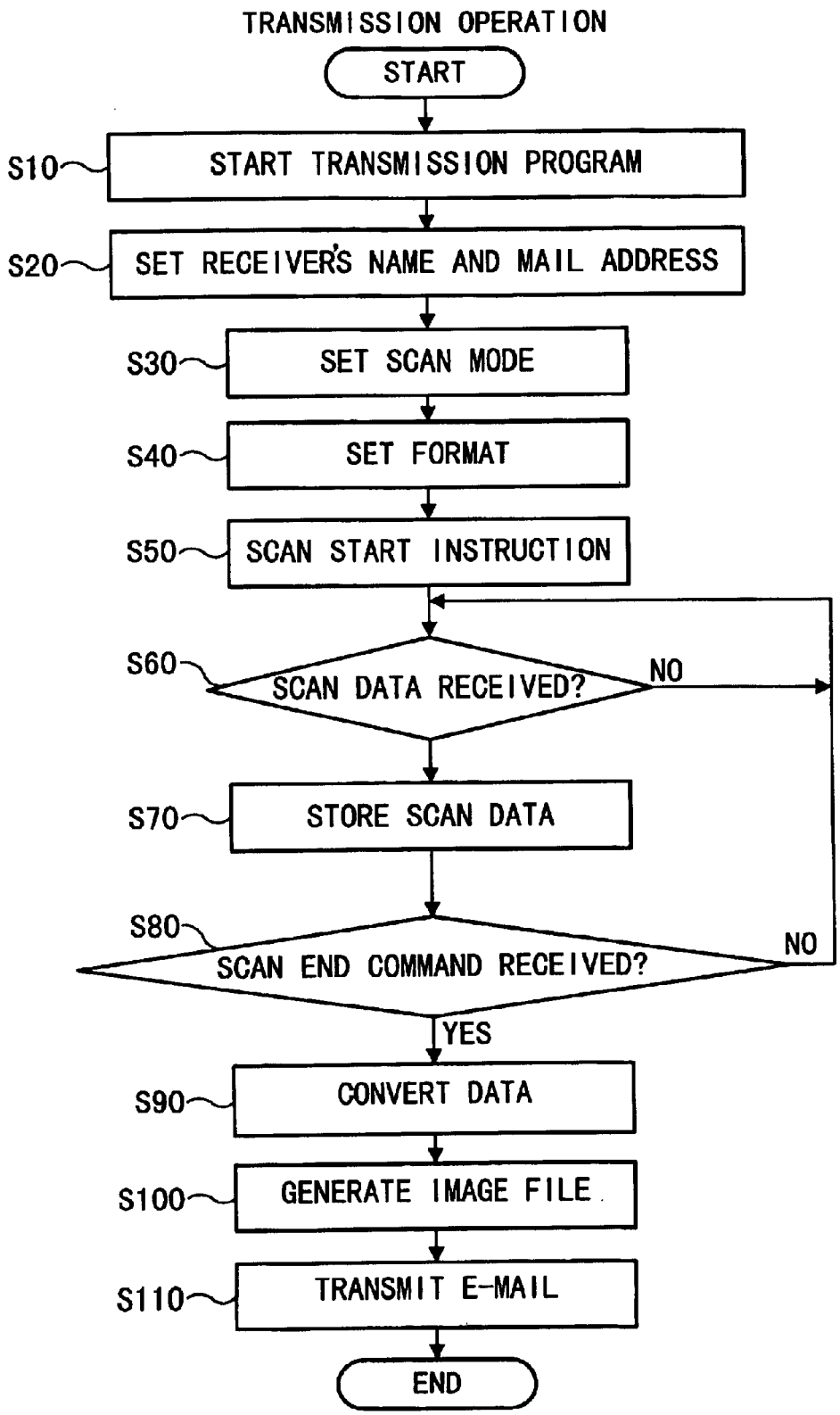
FIG. 5 is a flowchart illustrating a transmission operation executed by a CPU of the PC according to an embodiment of the invention.
Figure 6:
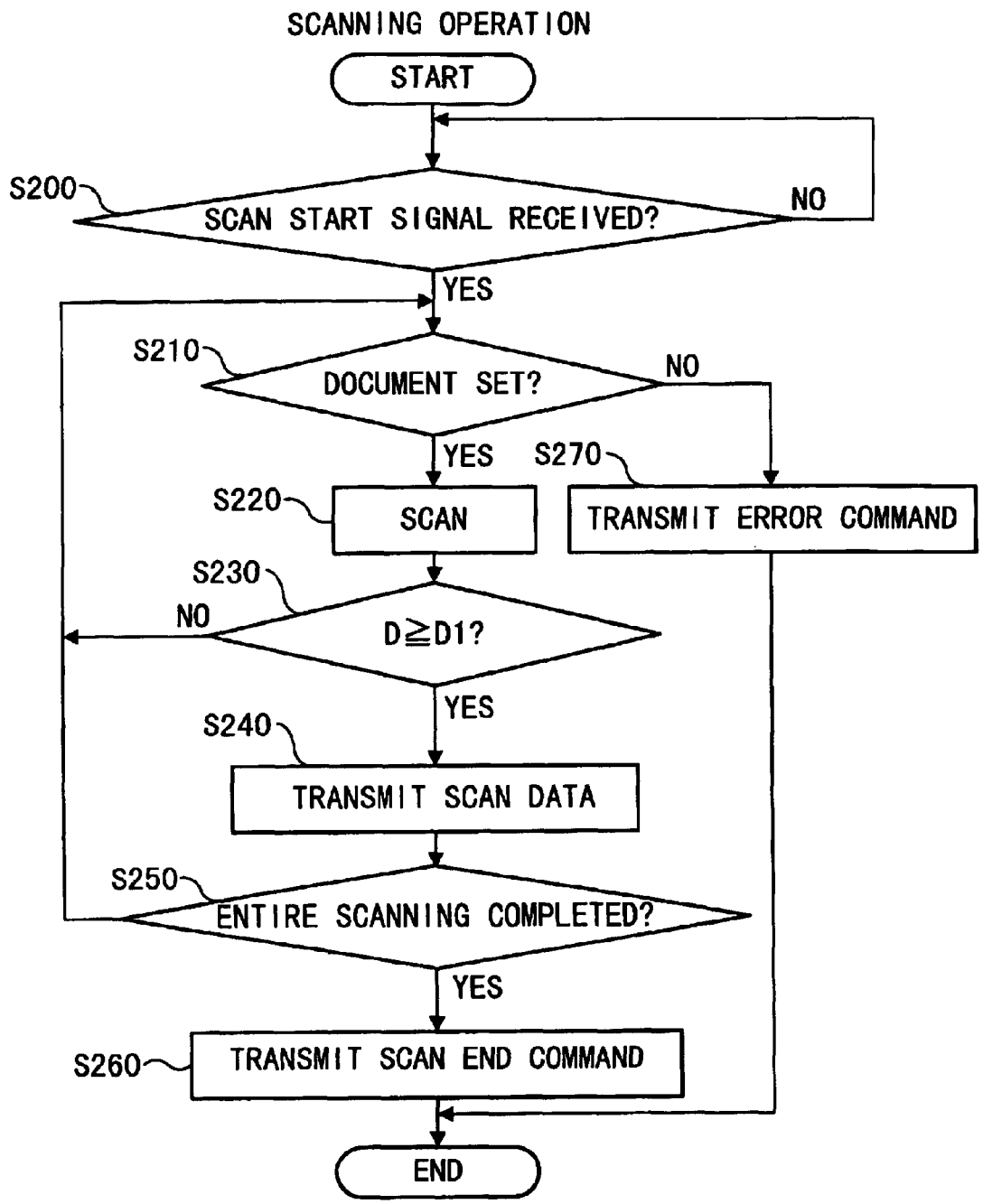
FIG. 6 is a flowchart illustrating a scanning operation executed by a CPU of the facsimile apparatus according to an embodiment of the invention.

The contents of a transmission operation executed by the CPU 25 provided in the PC 2 and a scanning operation executed by the CPU 30 provided in the facsimile apparatus 3 will be described with reference to the flowcharts of FIGS. 5 and 6. The flowchart of FIG. 5 illustrates the transmission operation executed by the CPU 25. The flowchart of FIG. 6 illustrates the scanning operation executed by the CPU 30.

The transmission operation herein means a series of operations wherein, for example, the CPU 25 causes the facsimile apparatus 3 to scan a document, receives scan data from the facsimile apparatus 3, attaches the scan data to an e-mail, and transmits the e-mail. The scanning operation herein means a series of operations wherein, for example, the CPU 30 causes the image scanner 38 to read image information from a document, and causes the scan data to be transmitted to the PC 2.

When an operator or user of the PC 2 provides an instruction to start a program (hereinafter, referred to as "transmission program") for causing the facsimile apparatus 3 to read image information from a document, attaching the scan data to an e-mail, and transmitting the e-mail, the CPU 25 reads out the transmission program from the HDD 21d, and stores the transmission program into the RAM 21c in step 10. At this moment, an e-mail transmission screen is displayed on the CRT monitor 24.

Subsequently in step 20, the CPU 25 reads address list data from the HDD 21d by using an address list managing program included in the transmission program. When the operator selects a receiver's name from the address list data, the selected receiver's name and mail address are read from the HDD 21d, and set in the receiver's name and mail address boxes for an e-mail.

Subsequently in step 30, the CPU 25 reads a scan mode setting program included in the transmission program. When the operator designates a scan mode, including a scan resolution, a scan area and the like, the CPU 25 sets the designated scan mode in the RAM 21c.

After the operator designates a format, for example, JPEG, GIF, or the like, for the scan data file from the facsimile apparatus 3 so that the scan data file can be attached to an e-mail, the CPU 25 sets the designated format in the RAM 21c in step 40. When the operator provides an instruction to start scanning, the CPU 25 outputs a scan start command to the facsimile apparatus 3 via the interface 29 in step 50.

When the CPU 30 of the facsimile apparatus 3 detects the scan start command via the PC interface 39 in step 200 in FIG. 6 (YES in step 200), the CPU 30 determines in step 210 whether a document is set. If the determination in step 210 is affirmative, the CPU 30 causes the image scanner 38 to read image information from the document in step 220. If a document is not detected (NO in step 210), the CPU 30 transmits an error command to the PC 2 in step 260.

The scan data obtained through the scanning operation is stored into the RAM 32. The CPU 30 determines in step 230 whether the amount D of scan data accumulated in the RAM 32 becomes equal to or greater than the data amount D1 of one page. When the accumulated data amount D equals or exceeds the one-page data amount D1 (YES in step 230), the CPU 30 reads the accumulated scan data from the RAM 32, and transmits the scan data to the PC 2 via the facsimile control circuit 41, the PC interface 39 and the connecting cable 4 in step 240.

Upon receiving the scan data from the facsimile apparatus 3 (YES in step 60), the CPU 25 of the PC 2 stores the received scan data into the HDD 21d in step 70.

The CPU 30 of the facsimile apparatus 3 determines in step 250 whether the entire scanning operation is completed. Until the entire scanning operation is completed, the facsimile apparatus 3 repeats the process of steps 210 through 240 to transmit scan data to the PC 2. After the end of the scanning operation (YES in step 250), the CPU 30 transmits a scan end command to the PC 2 in step 260. Upon receiving the scan end command (YES in step 80), the CPU 25 of the PC 2 reads the scan data from the HDD 21d, and converts the scan data into the format set in the RAM 21c in step 90, and generates an image file to be attached to an e-mail in step 100. Subsequently in step 110, the CPU 25 attaches the image file to an e-mail, and transmits the e-mail to the receiver designated in step 20.

The e-mail is transmitted via the telephone exchange 6, the ISP 7 and the Internet A, and then stored in the ISP 8. The receiver can receive the e-mail by accessing the ISP 8 from the facsimile apparatus 10. After decompressing the image file attached to the received e-mail, the receiver can see the content of the image file.

In this embodiment, after the scan start instruction is provided in the PC 2, the communication apparatus 1 of this embodiment automatically performs a series of operations including reception of scan data, format conversion of the received scan data, generation of an image file, attachment of the image file to an e-mail, and transmission of the e-mail together with the image file.

Therefore, the embodiment improves the working efficiency by reducing the number of procedural steps that need to be performed by a user between the start of scanning a document and the transmission of the scan data.

Although the foregoing embodiment is described in conjunction with the communication apparatus 1 combining the PC 2 and the facsimile apparatus 3, the communication apparatus of the invention may also be realized by the facsimile apparatus 30 alone if the operation executed by the CPU 25 of the PC 2 is executed by the CPU 30 of the facsimile apparatus 3.

According to the invention, the operation executed in step 50 by the CPU 25 serves as an instruction device, and the operation in step 60 serves as a reception device. The operation in step 80 serves as a detection or determination device. The operation in step 110 serves as a transmission device. The operation executed in step 90 by the CPU 25 serves as a conversion device, and the operation in step 40 serves as a designation device.

In the communication apparatus of the invention, when the instruction device provided in the computer instructs the facsimile apparatus to start scanning a document, the facsimile apparatus starts to read image information from the document, and automatically transmits the image information to the computer. When the determination device of the computer determines that the reception of the image information from the facsimile apparatus has been completed, the transmission device of the computer automatically transmits the received image information to a previously designated receiver-side apparatus beforehand, via a communication device. Therefore, the communication apparatus of the invention improves the facsimile apparatus working efficiency for transmitting the image information read from a document, via a communication device.

The communication apparatus of the invention may further have an e-mail transmission function of transmitting an e-mail via the Internet, and a conversion device that converts the image information received by the reception device, into a format such that the image information becomes attachable to the e-mail. With this structure, it becomes unnecessary for a user to perform an operation for converting the image information into a format such that the image information can be attached to an e-mail, in order to attach the image information received by the reception device, to the e-mail.

The communication apparatus of the invention may further have a designation device that, before the instruction device outputs instructions to the facsimile apparatus, designates a format for converting the image information so that the image information becomes attachable to the e-mail. Once the instruction is output from the instruction device, the communication apparatus automatically performs all the subsequent operations needed to transmit the image information-attached e-mail.

A communication apparatus capable of improving its working efficiency by reducing the number of procedural steps that need to be performed by a user in order to transmit image information read from a document by a facsimile apparatus, via a communication device, can also be realized by a storage medium for storing computer programs that include a transmission instruction program for instructing the facsimile apparatus to operate the reading device so that the reading device reads image information from the document and transmit the image information read by the reading device to the computer, a reception program for receiving the image information transmitted from the facsimile apparatus in accordance with the instruction provided by the transmission instruction program, a determination program for determining whether reception of the image information by the reception program has been completed, and a transmission program for transmitting the image information received by the reception program to a receiver-side apparatus via a communication device if the determination program determines that the reception of the image information by the reception program has been completed.

It is to be understood that the invention is not restricted to the particular forms shown in the foregoing embodiment. Various modifications and alterations can be made thereto without departing from the scope of the invention.

What is claimed is:

1. A communication system comprising: a facsimile machine and a processor, the facsimile machine including
    an image reader that reads image information from a document and a communication unit that sends the image information by selecting either sending the image information via a public communication switched network or via the global Internet, the processor including:
    an instruction device that instructs the facsimile machine to read image information from the document, and instructs the facsimile machine to transmit the image information read by the image reader to the processor;
    a scan mode setting device that sets a designated scan mode for scanning the image information, wherein the scan mode includes reading resolution and scan area;
    a reception device that receives the image information transmitted from the facsimile machine, the image information being automatically read by the image reader in response to the instruction provided by the instruction device;
    a conversion device that converts the image information received by the reception device, into a format such that the image information becomes attached to an e-mail in response to the reception of the image information at the reception device;
    a determination device that determines whether reception of the image information by the reception device has been completed; and
    an e-mail transmission device that attaches the image information converted by the conversion device to the e-mail, and transmits the e-mail through the communication unit to a receiver-side apparatus via an Internet in response to the determination by the determination device that the reception of the image information by the reception device has been completed.

2. The communications system according to claim 1, wherein the processor further comprises a designation device that, before the instruction device outputs an instruction to the image reader, designates a format for converting the image information so that the image information becomes attachable to the e-mail.

3. The communication system according to claim 2, wherein the conversion device converts the image information on the basis of the format designated by the designation device.

4. The communication system according to claim 1, wherein the processor further comprises an address setting device that sets a mail address of the receiver of transmitting the e-mail to the receiver-side apparatus.

5. A storage medium for storing a control program in a processor to operate a communication system comprising a facsimile machine and the processor, the facsimile machine including an image reader that reads image information from a document, and a communication unit that sends information by selecting either sending the image information via a public communication switched network or via the global Internet,
    the control program including:
    a transmission instruction program for instructing the facsimile machine to read image information from the document, and to transmit the image information read by the facsimile machine to the processor;
    a scan mode setting program that sets a designated scan mode for scanning the image information, wherein the scan mode includes reading resolution and scan area;
    a reception program for receiving the image information transmitted from the facsimile machine, the image information being automatically read by the image reader in response to the instruction provided by the transmission instruction program;
    a determination program for determining whether reception of the image information by the reception program has been completed;
    a conversion program that converts the image information received by the reception program, into a format such that the image information becomes attachable to an e-mail in response to the reception of the image information by the reception program; and
    an e-mail transmission program that attaches the image information converted by the conversion program, to an e-mail and transmits the e-mail through the communication unit to a receiver-side apparatus via an Internet in response to the determination by the determination program that the reception of the image information by the reception program has been completed.

6. The storage medium according to claim 5, wherein the control program further includes a designation program that, before the transmission instruction program outputs an instruction to the image reader, designates a format for converting the image information so that the image information becomes attachable to the e-mail.

7. The storage medium according to claim 6, wherein the conversion program converts the image information on the basis of the format designated by the designation program.

8. The storage medium according to claim 5, wherein the control program further includes an address setting program that sets a mail address of the receiver for transmitting the e-mail to the receiver-side apparatus.

9. A method for operating a communication system comprising:

a facsimile machine and a processor, the facsimile machine including an image reader that reads image information from a document, and a communication unit that sends the image information by selecting either sending the image information via a public communication switched network or via the global Internet, the method comprising the processor:

instructing the facsimile machine to read image information from the document, and to transmit the image information read by the facsimile machine to the processor;

setting a designated scan mode for scanning the image information, wherein the scan mode includes reading resolution and scan area;

receiving the image information transmitted from the facsimile machine, the image information being automatically read by the image reader in response to the instruction provided in the instructing step;

determining whether reception of the image information in the receiving step has been completed;

converting the image information received in the reception step, into a format such that the image information becomes attachable to an e-mail in response to the reception of the image information in the receiving step; and attaching the image information converted in the converting step to an e-mail and transmitting said image information through the communication unit to a receiver-side apparatus via an Internet in response to the determination in the determining step that the reception of the image information in the receiving step has been completed.

10. The method according to claim 9, further comprising designating a format for converting the image information so that the image information becomes attachable to the e-mail before the instructing step outputs an instruction to the image reader.

11. The method according to claim 10, wherein the converting step converts the image information on the basis of the format designated by the designating step.

12. The method according to claim 9, further comprising setting a mail address of the receiver for transmitting the e-mail to the receiver-side apparatus.

* * * * *